April 9, 1957 L. K. ARMSTRONG 2,788,393

TRUNK CIRCUIT

Filed Aug. 3, 1954 6 Sheets-Sheet 1

FIG. I

INVENTOR.
L. K. ARMSTRONG
BY J. Warren Whitesel
ATTORNEY

April 9, 1957 L. K. ARMSTRONG 2,788,393

TRUNK CIRCUIT

Filed Aug. 3, 1954 6 Sheets-Sheet 2

April 9, 1957 L. K. ARMSTRONG 2,788,393

TRUNK CIRCUIT

Filed Aug. 3, 1954 6 Sheets-Sheet 4

TRUNK CIRCUIT 106

April 9, 1957 L. K. ARMSTRONG 2,788,393

TRUNK CIRCUIT

Filed Aug. 3, 1954 6 Sheets-Sheet 5

TRUNK CIRCUIT 106

United States Patent Office 2,788,393

Patented Apr. 9, 1957

2,788,393

TRUNK CIRCUIT

Loren K. Armstrong, Fairport, N. Y., assignor, by mesne assignments, to General Dynamics Corporation, a corporation of Delaware Application August 3, 1954, Serial No. 447,567

11 Claims. (Cl. 179—18)

This invention relates to trunk circuits and more particularly to trunk circuit means extending calls from any of a plurality of sources.

In the past, telephone systems have been adapted to provide answering service for incoming calls, for example, on calls to a P. B. X when the operator is off duty. At times when night service is provided these answering systems have taken several forms. One form provides a tie-line which connects P. B. X trunks to some particular station, such as the telephone in a guard house, an operator at a main exchange, or a telephone answering service.

A desirable answering or call extending service circuit provides a simple and inexpensive means which may extend calls that are incoming on any one of a number of trunks. This device then may be seized over a standard switch train so that the call may be answered from any station serviced by that switch train. For example, means could be provided by which a roving night guard is signaled upon the occurrence of a trunk call. This guard may then go to any nearby telephone station, dial a proper number, and be connected via the device with the trunk on which the call is incoming to the P. B. X from the central exchange.

One object of this invention is to provide a new and improved call extending service trunk circuit.

Another object of this invention is to provide a simple and economical means by which incoming calls on any of a plurality of trunks may be answered from any location.

A still further object of this invention is to provide a new and improved night service circuit for use in a P. B. X.

These and other objects are accomplished by means of a call extending service trunk circuit which is provided with a suitable step switch. The switch is arranged to hunt for and find a trunk over which an incoming call is transmitted. A bell is rung or other suitable device is used to signal the presence of the incoming call. Responsive to this signal, anyone may dial a predetermined digit and seize the call extending service trunk circuit via the standard switch train. Thus, an incoming trunk call may be answered from any location throughout the private branch exchange because the switch in the call extending service trunk circuit has previously found the particular trunk which is servicing the incoming call.

Figure 1:
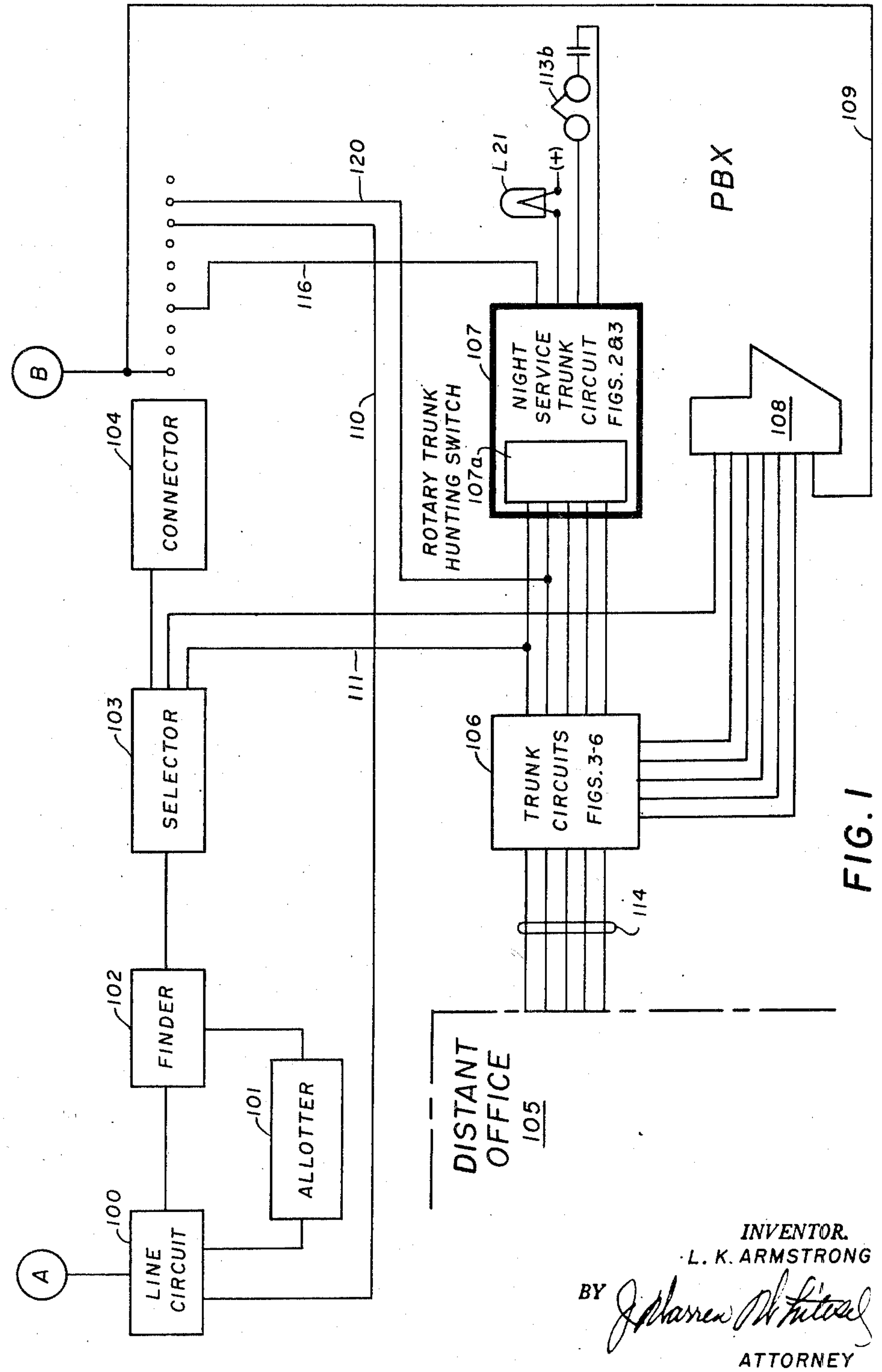
Figure 2:
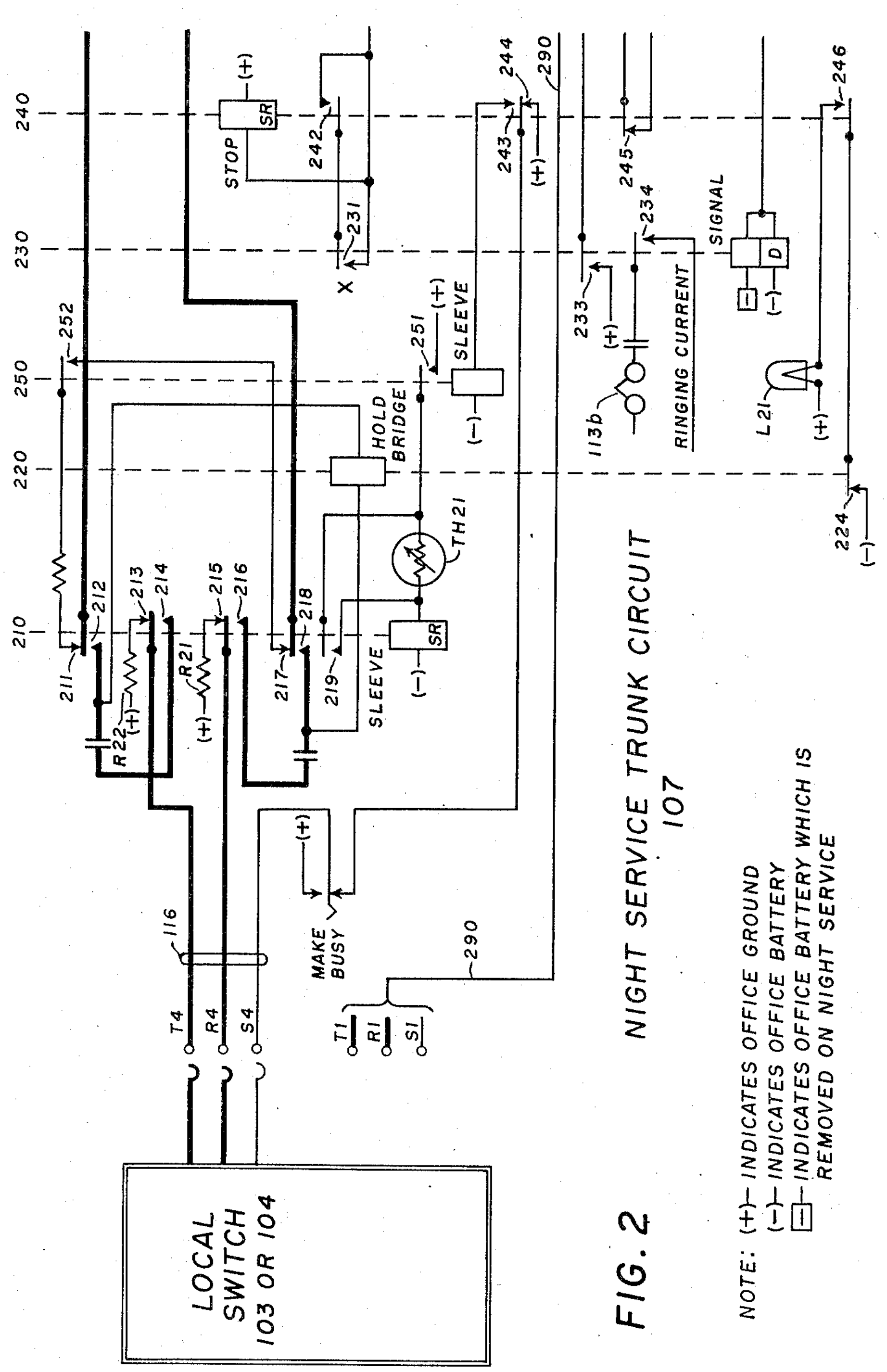
Figure 3:
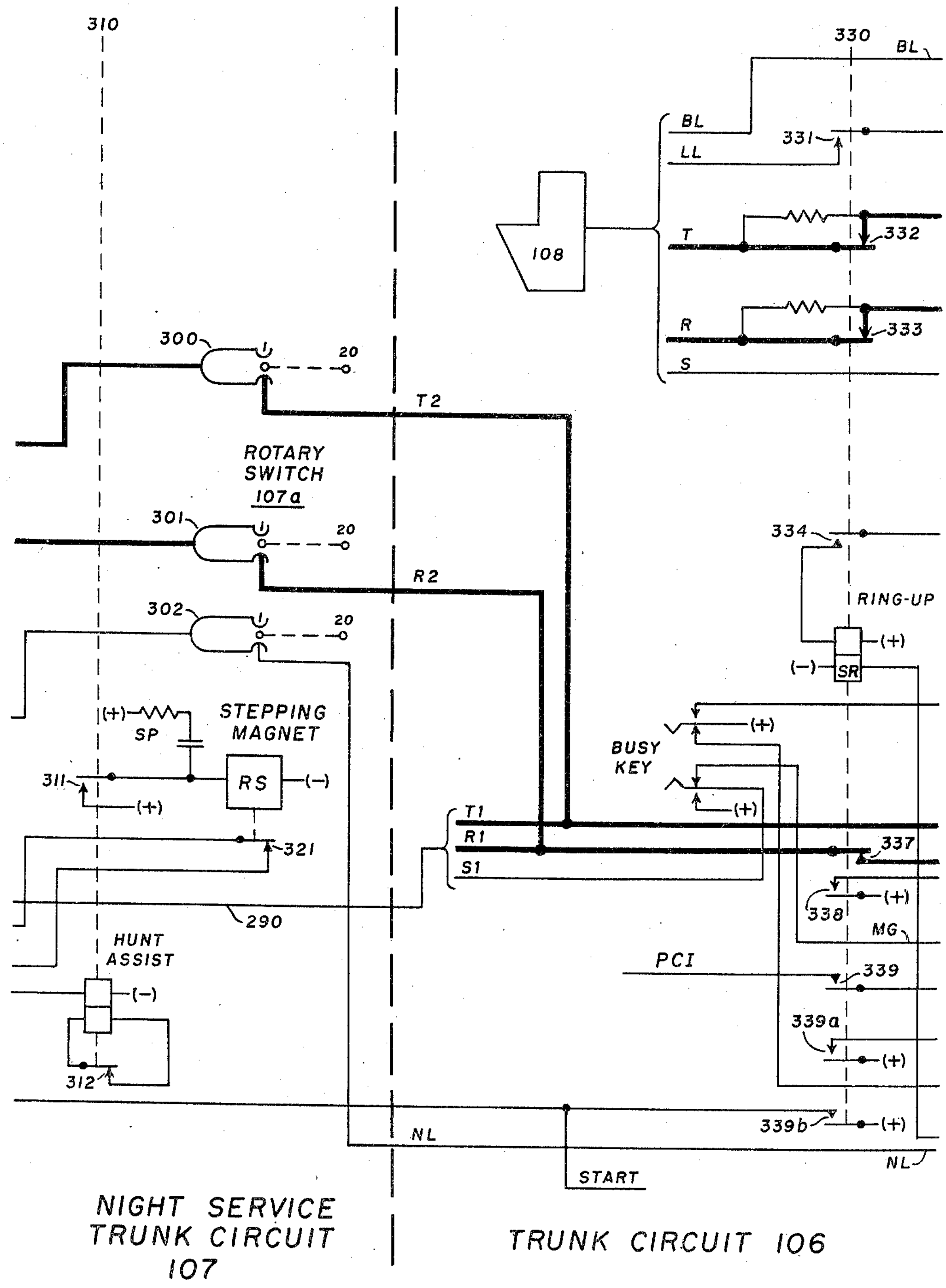
Figure 4:
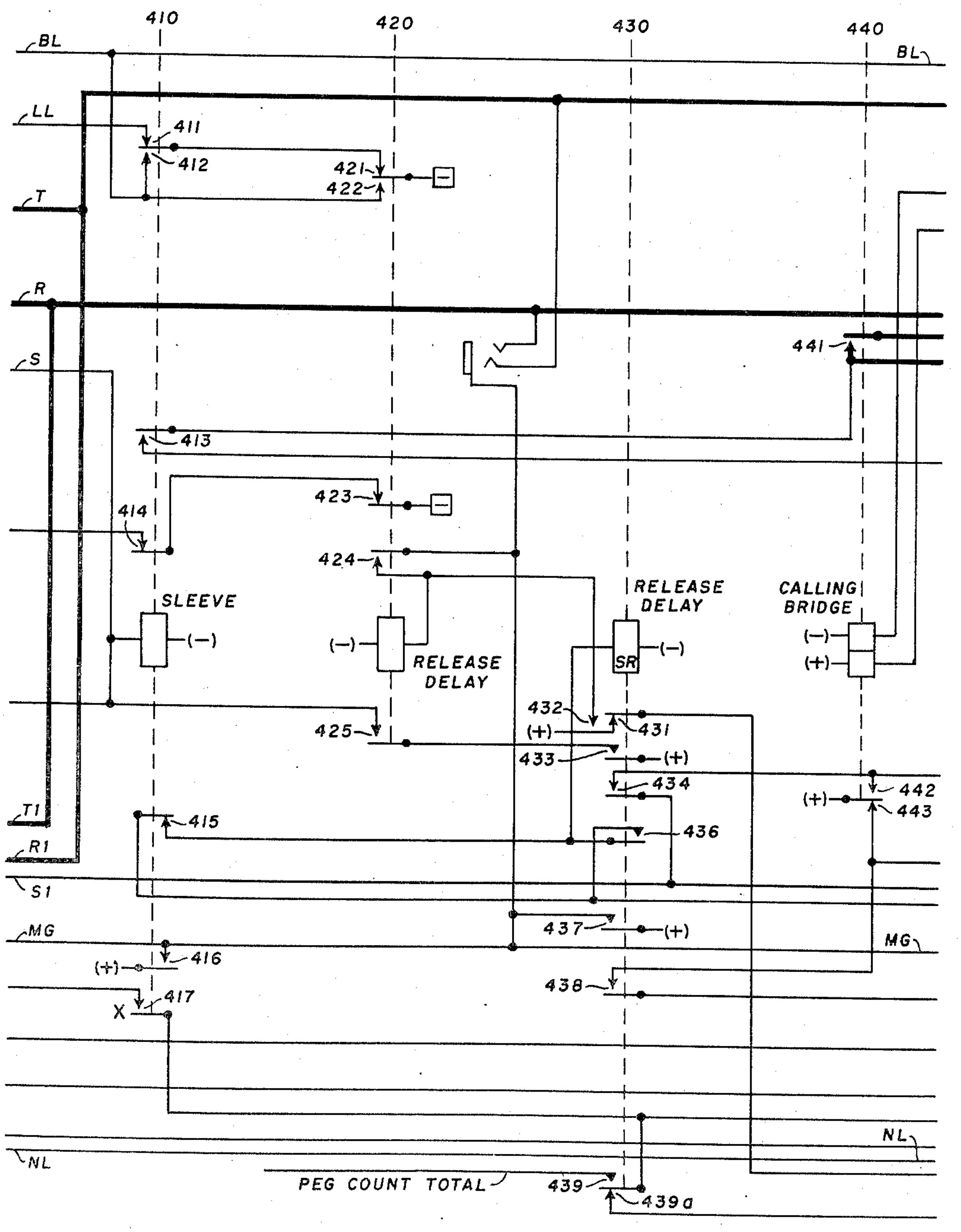
Figure 5:
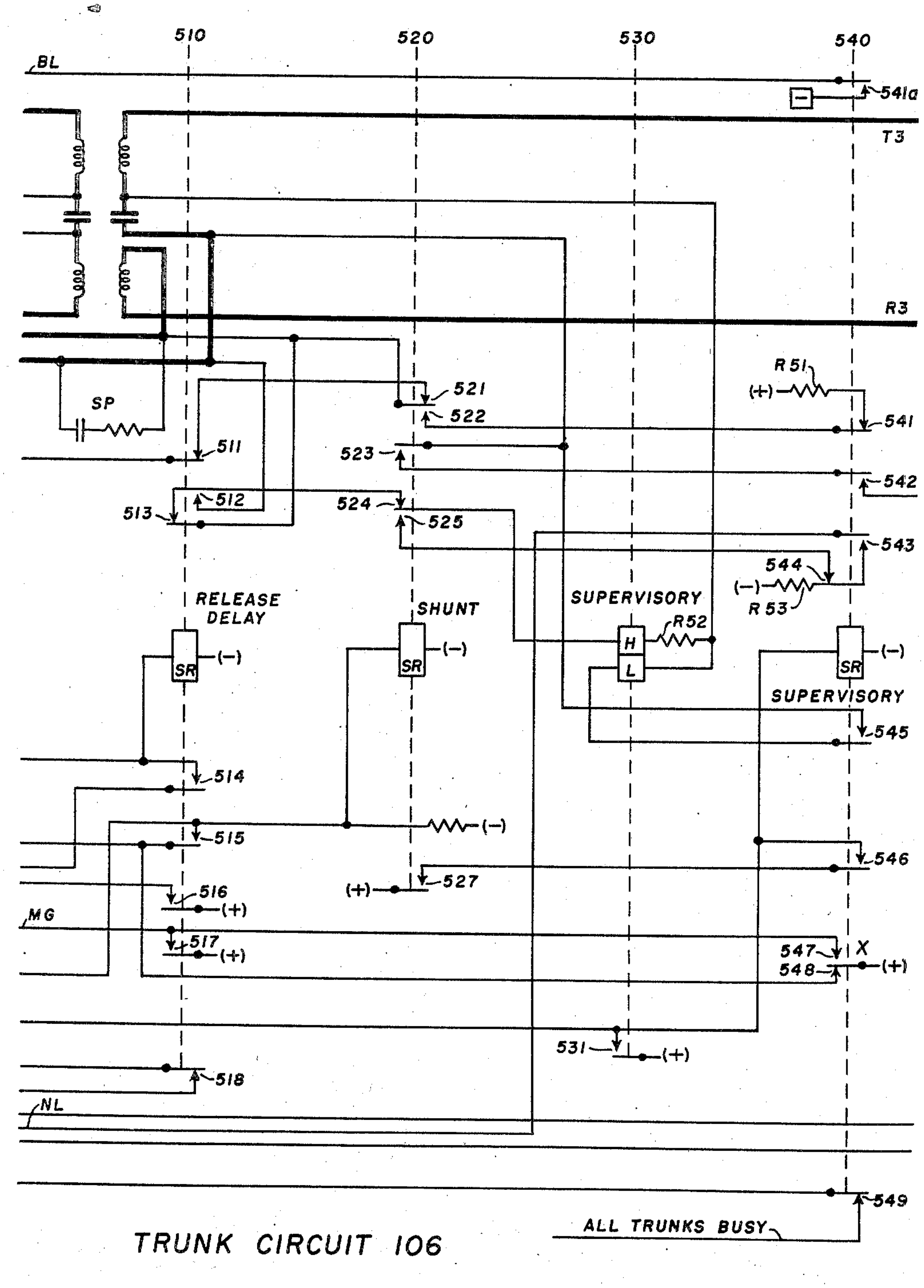
Figures 6, 7:
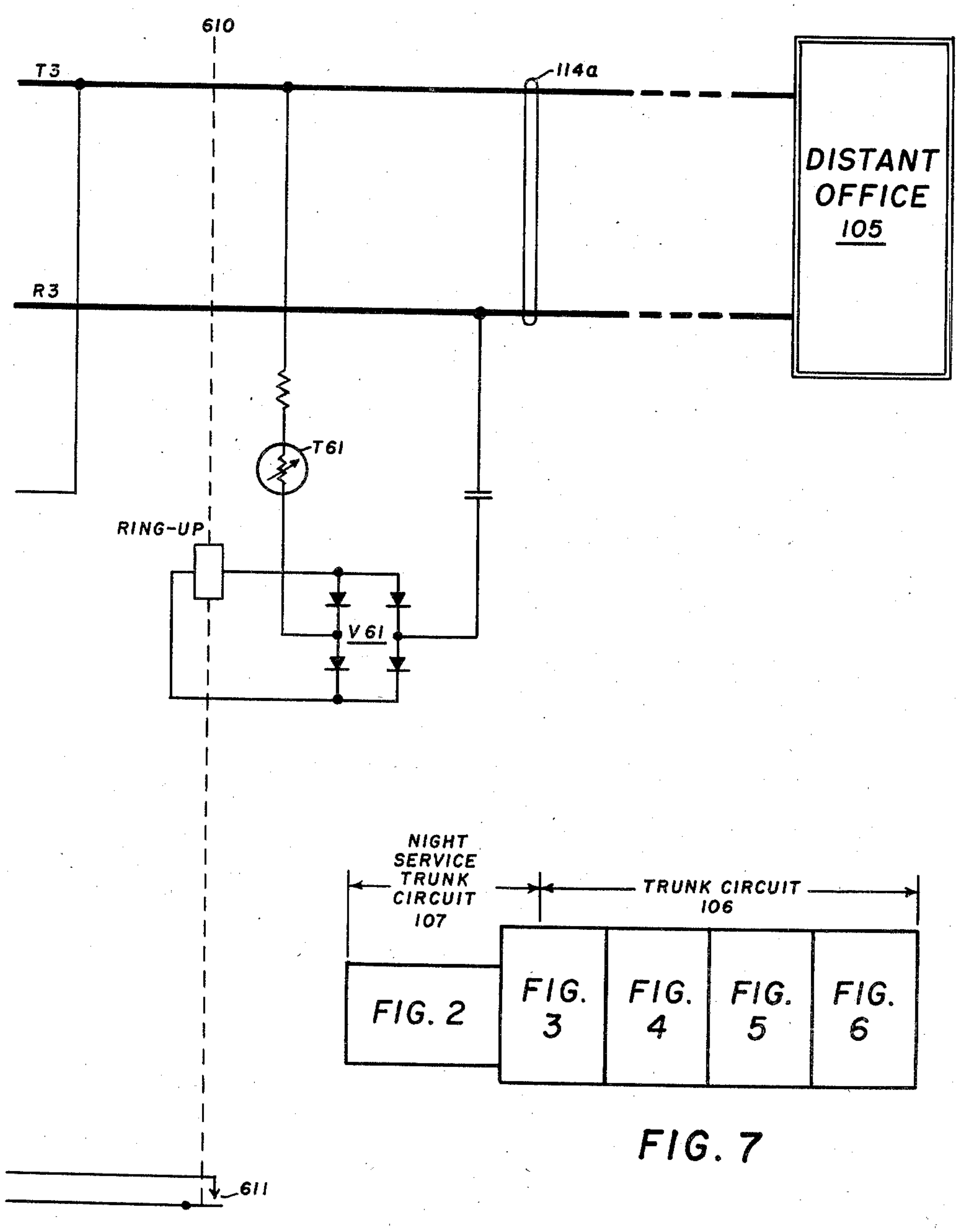

Referring next to the drawings which show circuit details of the subject invention, Fig. 1 shows, in block diagram, a P. B. X using the night service trunk circuit;

Fig. 2 and part of Fig. 3 show the night service trunk identified in Fig. 1 by hollow rectangle 107;

The remainder of Fig. 3 and Figs. 4–6 show the details of the trunk circuit which is shown in Fig. 1 by hollow rectangle 106; and Fig. 7 shows the manner in which Figs. 2–6 should be arranged to provide a complete and understandable circuit.

Both the office battery and the day service battery are shown in the drawings. For example, the standard office battery is shown by plus (+) and minus (−) signs included in parentheses, while day service battery is shown by a minus (−) sign included in a small square. The term "day battery" means the battery which is used during the day but is removed when the private branch exchange is placed on night service. As in the case of most telephone systems, the positive terminal is described as being connected to ground. It should be understood that this or any other suitable arrangement could be used.

There are many times in the art of electro-mechanical telephony when it is desirable to provide some means for extending calls to other than the original destination. For example, means may be provided for intercepting calls, for giving answering service to a professional man, such as a doctor, when he is out of his office, for night service and the like. The subject invention relates broadly to this type of service. For purposes of illustration only, the description and drawings are specific to night service trunk circuits; however, it should be understood that those skilled in the art may adapt the invention to other call extending service needs.

GENERAL DESCRIPTION

Fig. 1 is a block diagram to show how the invention operates. A call within the P. B. X may extend from subscriber A to subscriber B, for example. Subscriber A initiates the call by removing his receiver. Responsive thereto, line circuit 100 causes allotter 101 to operate finder 102. The line circuit also marks subscriber line A as busy to any calls which may be incoming over conductor 110 from a connector bank. Finder 102 hunts to find the line of calling subscriber A. Responsive thereto, selector 103 returns dial tone. Upon hearing dial tone, subscriber A proceeds to transmit a suitable number of digits for causing selector 103 and connector 104 to seize the called subscriber line, such as B, for example.

If it should be necessary for subscriber A to call outside of the private branch exchange, he dials a proper digit for causing selector 103 or connector 104 to seize a suitable outgoing trunk which could be by way of conductor 111 or conductor 120 and one among the group of trunk circuits 106, for example, depending on how the office switches are connected. More specifically, in private branch exchanges, sometimes it is useful to have access to the outside trunk circuits off a particular level in the selector switch while at other times access is off a particular level in a connector switch. For example, it is common to dial 9 for an outside trunk via a first selector. In another typical case, the first eight levels of a connector, for example, may be used on a directive basis whereby each subscriber line is seized by a connector-like action responsive to directive motions in both of two directions, while the last levels are used in a selector-like action wherein the primary switch motion is directive responsive to a digit while the secondary motion is selective to seize an idle trunk automatically. Either of these types (or others, not shown) of service may be provided without departing from the scope of my invention.

On occasions it may be necessary to call an operator from station A. This call may be completed from either selector or connector banks, as desired. For purposes of illustration, access to the operator is shown by way of a selector switch. In this case, calling subscriber A would probably remove his receiver and dial zero to get the operator.

On incoming calls from distant office 105, any one of a number of P. B. X trunks 114 may be used. Each of these trunks terminates in a suitable trunk circuit; however, for purposes of illustration, I have lumped all trunk circuits into a hollow rectangle marked 106. From the trunk circuits a connection is extended to operator position 108 where the operator may answer the call by any suitable means. Following this, she connects to the line multiple of the called subscriber such as B, for example, in any desired manner such as by a plug and jack arrangement and conductor 109.

At times when answering service is provided or at night after the P. B. X is normally closed and operator 108 is off duty, a circuit is completed to enable a call extending service trunk circuit 107, hereinafter called a night service trunk circuit. Following this, any incoming calls from distant office 105, which may be extended over trunk conductors 114 to trunk circuits 106, starts a rotary trunk hunting switch **107*a* which is included as part of night service trunk circuit 107. Rotary switch 107*a* hunts for and finds the trunk on which the incoming call is extended. Subsequent thereto, a suitable signal or alarm, such as lamp 121 or bell 113*b*, is used to attract the attention of any interested personnel. For example, this person may be a roving guard or someone who is working after office hours in the areas served by the P. B. X. Responsive to this signal, the person will pick up a telephone such as at station A, for example, to answer the call. Again, line circuit 100, allotter 101, and finder 102 cooperate to find the called line. Dial tone is returned from selector 103. Suitable digits are now transmitted from station A to set selector 103 and connector 104 to seize the terminal which is individual to the night service trunk circuit. For example, this terminal may give access to conductor 116. Since night service trunk circuit 107 is connected with incoming trunk circuits 106 via rotary switch 107*a*, it is seen that subscriber A is now connected to talk with the calling party via line circuit 100, finder 102, selector 103, connector 104, conductor 116, night service trunk circuit 107, a trunk circuit in group 106, and a particular trunk conductor among group 114, to distant office 105**.

DETAIL DESCRIPTION

*Call from subscriber A to distant office 105*

The first call to be described in detail is one from the P. B. X through a trunk circuit in group 106 to a distant office 105.

*Seizure of trunk circuit.*—To initiate this call, subscriber A makes a suitable series of operations responsive to which a circuit is completed for operating calling bridge relay 440 in trunk circuit 106. The purpose of this relay is to seize the trunk circuit shown in Figs. 3–6 and to repeat digit pulses. The circuit for operating relay 440 may be traced from (−) battery, through the upper winding of relay 440, upper left winding of the repeat coil, normal contacts 337, ring conductor R1, conductors 290, the selector or connector, as the case may be, subscriber station A, and return on conductors 290 and tip conductor T1, lower left winding of the repeat coil and the lower winding of calling bridge relay 440, to ground (+). Relay 440 operates. Contacts 441 close to prepare a pulsing path.

Contacts 442 close to operate release delay relay 510. This relay, when operated, holds trunk circuit 106 operated while calling bridge relay 440 is alternately operating and releasing to repeat digit pulses at contacts 441. Contacts 517 close to apply a ground (+) marking to sleeve conductor S1 via the busy key thereby marking trunk circuit 106 busy to other connectors. This is also the ground from which most of the relays are held; therefore, it is called master ground and the conductor to which it connects is marked by the letters MG which means "master ground." Contacts 516 close to operate another release delay relay 430 over the path which may be traced from contacts 516, contacts 415 and the winding of release delay relay 430 to (−) battery. This relay is merely a slave of relay 510. The opening of contacts 518 removes ground from the all-trunks-busy conductor. The purpose of this conductor is to provide an overflow signal by means of which a record may be kept to determine how many times no trunks are available to outgoing calls. That is to say, each available trunk circuit such as 106 normally applies a ground (+) marking to the all-trunks-busy conductor by way of the upper normal contacts of the busy key (Fig. 3), normal contacts 518, **439*a* and 549. As each trunk of group 106 becomes busy, this ground marking is removed so that when all are busy the all-trunks-busy conductor is completely open and this open (or absence of ground) is used to register an indication of overflow. Contacts 515 close to operate shunt relay 520 over a circuit which includes (−) battery, the winding of shunt relay 520, closed contacts 515 and 548, to ground (+). The purpose of this relay is to shunt the repeat coil to prepare a metallic pulsing path to distant office 105 over trunk conductors 114*a*. Release delay relay 510 locks via contacts 514 and 434 (when operated) to ground (+) applied by calling bridge relay at contacts 442**.

In response to the operation of relay 430, contacts **439*a* open the all-trunks-busy conductor a second time. Contacts 439 close to prepare for operating a peg count meter. This device registers the total number of calls going through the trunk circuit. Contacts 438 close to prepare part of a locking path for shunt relay 520. Contacts 437 close to apply an alternate master ground to conductor MG. Contacts 434 extend ground (+) from contacts 442 through contacts 514 to hold release delay relay 510. Contacts 436 provide a locking circuit for relay 430 under the influence of contacts 516. Contacts 431 open to prevent any faulty operation of ring-up relay 330** at this time.

Contacts 432 close to complete a connection to operate another release delay slave relay 420. This relay provides supervision to switchboard 108 and to ring-up relay 330 on day service operation. Sleeve conductor S, leading to operator position 108, is marked busy by means of ground extended via contacts 433 and 425. Contacts 424 lock release delay relay 420 in an operated condition under influence of master ground (+) applied to the MG conductor from contacts 517 and 437. Contacts 423 open to remove (−) day battery to prevent any possible locking of ring-up relay 330. Contacts 422 close to extend a (−) day battery marking over conductor BL to light a busy lamp at the operators' positions. Contacts 421 open to prevent the extension of any possible (−) day battery marking over incoming lamp conductor LL. Contacts 425 close to operate sleeve relay 410 over a circuit which may be traced from (−) battery, through the winding of sleeve relay 410, contacts 425 and 433, to ground (+). Relay 410 has no function at this time.

*Seizure of distant office.*—Shunt relay 520 operated when release delay relay 510 closed contacts 515, thus completing a circuit from (−) battery, through the winding of shunt relay 520, closed contacts 515 and 548, to ground (+). Shunt relay 520 closes contacts 527 to prepare a locking path for supervisory relay 540. Contacts 523 close to prepare a pulsing circuit to the distant office. Contacts 525 cooperate to transmit a seizure signal to the distant office via trunk conductors **114*a*, a circuit being traced from conductor R3, through the lower right winding of the repeat coil, operated contacts 522, and rest contacts 541, to ground (+) by way of resistor R51. In a similar manner, a circuit may be traced from conductor T3, through the upper right winding of the repeat coil, resistor R52, the upper winding of supervisory relay 530, operated contacts 525, and rest contacts 544, to (−) battery by way of another resistor R53. This resistance battery and ground marking is a seizure signal to distant office 105**.

Responsive to seizure in the distant office, ground (+) is connected to conductors T3 in any suitable manner (not shown) so that supervisory relay 530 operates. The circuit for this function extends from conductor T3, through the upper right winding of the repeat coil, resistor R52, the upper winding of supervisory relay 530, and operated contacts 525, to (−) battery applied through contacts 544.

Supervisory relay 530 closes contacts 531 which completes a circuit through the winding of supervisory relay 540 to (−) battery causing it to operate. Contacts 541 open to remove the ground (+) marking applied to conductor R3, while contacts 544 open to remove the (−) battery marking applied to conductor T3. Contacts 542 close to complete a loop across the talking conductors exclusive of the repeat coil and by way of contacts 523 and pulsing contacts 441, thereby preparing a pulsing path. This loop may be traced from the distant office over conductor T3, through contacts 542, 523, 441, the lower winding of the repeat coil, and back to the distant office over conductor R3. Contacts 543 are useful in night service only. Contacts 545 close to place the lower winding of supervisory relay 530 across conductors T3 and R3, for a purpose which will be explained later. Contacts 546 close to lock supervisory relay 540 in an operated condition under the influence of shunt relay 520 through contacts 527. Contacts 548 open and 547 close to apply an alternate ground (+) to master ground conductor MG while breaking the original operating path to shunt relay 520.

*Dialing.*—The trunk circuit is now ready for dial pulses. Each pulse that is received from subscriber A is in the form of an open loop or a break in the circuit which extends from (−) battery, through the upper winding of calling bridge relay 440, upper left winding of the repeat coil, ring conductor R1, contacts 337, the subscriber's telephone and dial springs, tip conductor T1, the lower left winding of the repeat coil, and through the lower winding of calling bridge relay 440 to ground (+). Responsive to each digit pulse break in this loop, calling bridge relay 440 releases to open contacts 441 thus breaking the loop to the distant office and thereby repeating the digit pulse to the distant office. This loop may be traced from the distant office, conductor R3, through the lower right winding of the repeat coil, contacts 441, 523 and 542, to tip conductor T3 and the distant office.

Following transmission of the last digit pulse, shunt relay 520 releases. It originally operated over a path including contacts 515 and 548. This path opened when supervisory relay 540 operated. Therefore, during pulsing, shunt relay 520 held operated over a path which included contacts 515 and 443. Contacts 443 opened responsive to the termination of each digit pulse; however, shunt relay 520 does not release during pulsing since it has slow release characteristics. However, following the last digit pulse, the circuit to shunt relay 520 is held open at contacts 443 long enough for it to release. On each succeeding digit pulse train, contacts 443 close responsive to the first digit pulse thereby reoperating shunt relay 520 to recomplete the loop necessary for transmitting signals to the distant office.

Equipment in distant exchange 105 responds to these digit pulses to seize and signal the called line by any suitable equipment not shown. When the called party answers, battery from the distant office is reversed over conductors T3 and R3, thus causing supervisory relay 530 to flick off and on or stated otherwise to restore and reoperate after a brief interval. However, this is of no effect since supervisory relay 540 is made slow to release. No provision is made for repeating this answer supervision through trunk circuit 106; although supervision of this type could be provided responsive to the flick of relay 530, if necessary. Conversation follows over tip and ring conductors shown by the heavily inked lines near the top of Figs. 3–6 and by conductors 290.

*Release.*—When the conversation is over, calling subscriber A disconnects and opens the loop across conductors T1 and R1. This causes calling bridge relay 440 to release. Contacts 442 open to restore release delay relay 510. Contacts 441 open the loop to the distant exchange so that equipment there releases.

Release delay relay 510 releases and removes one of the alternate master ground (+) connections at contacts 517. When contacts 518 close, a circuit is completed momentarily to operate the peg count total meter. This circuit may be traced from the peg count total conductor, through operated contacts 439, release delay relay contacts 518, to ground (+) applied by way of the make busy key. After a brief interval, release delay relay 430 releases to open this circuit at contacts 439. Release delay relay 510 also opens the circuit to release delay relay 430 by opening contacts 516. That is, release delay relay 430 had been holding from (−) battery, through its lower winding, contacts 436 and 516, to ground (+).

After a brief interval marked by its slow release characteristics, release delay relay 430 releases, the circuit to shunt relay 520 is opened at contacts 438, the peg count meter is disconnected at contacts 439, contacts 434 have no effect at this time. Contacts 433 open to remove the busy ground marking formerly extended over conductor S and contacts 432 open a holding path to release delay relay 420.

Shunt relay 520 restores (if then operated) responsive to the opening of contacts 438. It reconnects the repeat coil to its normal idle line condition. At contacts 527, a circuit is opened for releasing supervisory relay 540 which at contacts 549 restores a ground (+) marking to the all-trunks-busy conductor. This circuit includes contacts 549, 439*a*, 518 and ground (+) on the busy key. At contacts 547, the last master ground (+) marking is removed causing relay 420 to release. Relay 420 removes the (−) day battery from the busy lamp conductor BL by opening contacts 421. The circuit is now completely released and prepared for the next call.

*Call from operator 108 to the distant office*

The operator initiates the call by completing a suitable connection as by means of a plug and jack, for example, thereby extending a ground (+) marking (not shown) from switchboard 108 over sleeve S conductor to operate sleeve relay 410. This opens contacts 415 thereby preventing the operation of release delay relays 430 and 420. It should be recalled that the path for originally operating release delay relay 430 extended from (−) battery, through the winding of relay 430, contacts 415 which are now opened, to ground (+) applied by contacts 516. With neither of these relays operated, the busy lamp is lit over the path extending from (−) day battery, through contacts 421, 412 and busy lamp conductor BL. The circuit to the incoming lamp over conductor LL is opened at contacts 411. Aside from this distinction, the call from operator 108 to distant office 105 is substantially the same as that previously described from subscriber A to the distant office 105.

*Call from distant office 105 to operator 108*

*Ring down.*—Incoming ringing current is transmitted from distant office 105 via trunk conductors 114*a* to ring-up relay 610 by way of a thermistor and varistor bridge arrangement. The thermistor T61 is included to provide a slight time delay to prevent operation of relay 610 responsive to transients of the same frequency as ringing current. The varistor bridge V61 is provided to adapt relay 610 to respond to ringing current. Relay 610 responds to the alternating current of the ringing signal and closes contacts 611 to operate ring-up relay 330 over a circuit extending from (−) battery through the lower winding of relay 330 to contacts 611 and ground (+) applied over rest contacts 431. Ring-up relay 330 operates and locks from ground (+), through its upper winding, contacts 334, 414 and 423, to (−) day battery.

Responsive to the operation of ring-up relay 330, contacts 331 close to light an incoming lamp at switchboard 108, this being via (—) day battery, contacts 421, 411, 331 and conductor LL. Contacts 337 and 339b are for a purpose which will be explained in connection with night service calls. Contacts 339 close to prepare a peg count service. Contacts 339a close to operate supervisory relay 540.

Relay 540 closes contacts 541a thereby extending (—) day battery over conductor BL to light a busy lamp at switchboard 108, thus marking this trunk circuit busy to all other operators. The trunk circuit is marked busy to all selectors or connectors by a ground (+) marking applied to conductor S1 via busy key contacts, master ground conductor MG, and operated "X" or preliminary contacts 547. Contacts 543 close to extend a (—) battery marking to the night service trunk circuit via conductor NL; however, this circuit has no function at this time. Ground is removed from the all-trunks-busy conductor by now opened contacts 549.

*Operator answers.*—The circuit remains in the condition described until the operator at position 108 notices the condition of her incoming call lamp which is lighted responsive to closure of contacts 331. She then responds by making a suitable connection, such as by a plug and jack, for example, to operate sleeve relay 410 via sleeve conductor S. Relay 410 opens contacts 411 thereby extinguishing the incoming call lamp, while closing contacts 412 to apply an alternate (—) day battery marking to conductor BL for lighting a busy lamp. Contacts 417 close to connect a ground (+) marking with peg count (in) conductor PCI thereby recording the number of calls extended through trunk circuit 106 from distant office 105. Peg count is via contacts 339, 417, 518, and the busy key to ground (+). The holding circuit for ring-up relay 330—which formerly extended through contacts 334, 414 and 423—is opened at contacts 414 causing relay 330 to release. Contacts 413 close to trip the transmission of ringing current from distant office 105 and to complete a talking circuit over conductors T3 and R3. For example, a loop is now completed which may be traced as follows: ring conductor R3, the lower right winding of the repeat coil, contacts 521, 511, 413, 545, the lower winding of supervisory relay 530, the upper right winding of the repeat coil, and conductor T3. It should be noted that another path could be traced through the upper winding of supervisory relay 530 to complete a loop across the conductors T3 and R3; however, the relative resistance of the windings of relay 530 and the presence of resistor R52 are such that ringing will not be tripped until a loop is completed by way of the low resistance of the lower winding of supervisory relay 530.

When ring-up relay 330 releases, contacts 339a open thus transferring the control of supervisory relay 540 to contacts 531 which are controlled by supervisory relay 530. Contacts 339 open to remove the ground (+) marking from peg count (in) conductor PCI. Contacts 339b remove ground from the start conductor. Thus, the common interrupter stops if no other circuit is then marking the start conductor.

Calling bridge relay 440 operates over the loop to the calling operator including (—) battery, the upper winding of relay 440, the upper left winding of the repeat coil, contacts 332, conductor T, the operator position, conductor R, contacts 333, and the lower left winding of the repeat coil to ground (+) through the lower winding of calling bridge relay 440. Contacts 442 close to operate release delay relay 510; contacts 441 close to complete another path for the talking circuit to the distant office.

Conversation follows, at which time the operator at position 108 discovers the destination of the call and proceeds to complete it by any suitable means.

*Release.*—When the operator at position 108 breaks the connection with the trunk circuit at the termination of the call, calling bridge relay 440 is released; thus contacts 442 open to restore release delay relay 510. This in turn removes the ground (+) marking extended from contacts 517 to sleeve conductor S1 and to master ground conductor MG. Sleeve relay 410 releases responsive to the operator's action to remove an alternate battery from BL conductor which lights busy lamps. Any relays that are now operated are released at this time responsive to removal of master ground at contacts 416.

*Night service*

The next call to be described is one requiring the use of night service trunk circuit 107. A call of this type is incoming from distant office 105.

In general, trunk circuit 106 functions in the manner described above in connection with the call from distant office 105 to operator 108. When ring-up relay 330 operates responsive to receipt of ringing current, ring-up relay 330 does not lock operated via contacts 334, 414 and 423 since the (—) day battery on contacts 423 is removed at night. Instead relay 330 follows the periods of ringing current as transmitted from distant office 105. Contacts 339b, when closed, extend ground (+) to signal relay 230. At night the (—) battery markings shown in small squares are disconnected while those shown in parentheses remain connected both day and night; therefore, signal relay 230 is connected to be differentially energized from ground (+) on contacts 339b during the day when (—) day battery is connected through the upper windings. However, at night when contacts 339b are closed, a circuit is completed through the lower winding of signal relay 230 to the (—) battery shown in parentheses.

Signal relay 230 operates. The purpose of this relay is to initiate operation of the night service trunk circuit and to signal the presence of a night service call. Contacts 234 close to connect a suitable source of ringing current to sound signal 113b. The ringing current may be continuous and uninterrupted since ring-up relay 330 and signal relay 230 are following ringing periods from the distant office, or, other suitable ringing signals may be used. Contacts 233 close to operate hunt assist relay 310 which is adapted to cooperate with the rotary switch stepping magnet to impart switch motion to search for the trunk carrying the incoming call. The circuit for operating relay 310 extends from ground (+) over operated contacts 233, rest contacts 321 and 245 to (—) battery by way of the upper winding of relay 310. This relay operates and opens its contacts 312. The purpose of the shorted winding including contacts 312 is to increase the operate time of hunt assist relay 310. When contacts 312 are open, the winding has no effect.

The rotary switch RS is now stepped to hunt for the trunk carrying the incoming call. Contacts 311 close responsive to the operation of relay 310 thereby connecting rotary switch stepping magnet RS to ground (+) thus causing it to operate and step the rotary switch. When rotary switch magnet RS operates, it opens contacts 321 thereby releasing hunt assist relay 310. This in turn opens contacts 311 causing rotary switch stepping magnet RS to release. When contacts 321 close, hunt assist relay 310 reoperates after a brief interval measured by the characteristics of the lower, shorted winding. This cycle repeats and the rotary switch continues to step in search of the trunk carrying the incoming call. When signal relay 230 operated, it closed contacts 231 thereby connecting stop relay 240 to the lower brush 302 on the rotary switch. Also, it might be noted that when trunk circuit 106 was seized from distant office 105 and after supervisory relay 540 operated in the manner described above in the section entitled "Call from distant office 105 to operator 108," contacts 543 close to extend a (—) battery marking over night lead NL. This conductor connects to the lower bank of the rotary switch which is served by wipers 302, so that in effect, conductor NL functions as a sleeve conductor. Each of the incoming trunks in group 114 (Fig. 1) is connected with a different set of terminals in the bank of the rotary switch. Therefore, the rotary switch continues to operate until the trunk which is carrying the call is found.

Stop relay 240 operates over the circuit from (−) battery, contacts 543, night lead conductor NL, brush 302, contacts 231 and through the winding of stop relay 240 to ground (+). Responsive thereto, contacts 242 close to lock the stop relay in an operated condition. Contacts 243 close to prepare a circuit for sleeve relay 250 while contacts 244 open to remove a busy ground (+) marking from sleeve conductor S4. This busy sleeve marking prevents anyone from seizing the night service trunk circuit 107 except when there is an incoming call during a period when the circuit is adapted for night service. Contacts 245 open to disable hunt assist relay 310 thereby holding contacts 311 open and stopping the action of rotary switch stepping magnet RS. Lamp L21 lights when stop relay 240 closes contacts 246. This lamp is in a prominent place where it normally attracts the attention of a person designated to answer night service calls. This person may be a single individual such as a secretary, a receptionist, or a guard; moreover, this "person" may be a group of persons such as volunteer firemen, any one working in a certain area, supervisors or the like.

*Answer*.—Audible signal 113*b* sounds and visual signal L21 lights to attract the attention of any nearby person such as a roving guard, for example. Responsive to one of these signals, the guard proceeds to any nearby telephone such as substation A (Fig. 1). He removes the receiver and is connected to selector 103 by the joint action of line circuit 100, allotter 101, and finder 102. Selector 103 returns dial tone. The person answering the call then proceeds to dial a proper set of digits for seizing night service trunk circuit 107. This causes connector 104 to seize conductors 116 which are shown in the upper left portion of Fig. 2.

The connector normally transmits ringing current to a called line; therefore ringing current is transmitted over conductors T4 and R4. This ringing current is tripped by the ground (+) markings transmitted through resistors R21 and R22.

It is noted that the night service trunk circuit is marked idle by the (−) battery extended through the winding of sleeve relay 250, and contacts 243 to sleeve conductor S4. Sleeve relay 250 operates over this circuit responsive to seizure from the connector banks. Contacts 252 close to prevent further transmission of ringing current (if any) into the night service trunk circuit over conductors T2 and R2 because in some cases trunk circuits such as 106 would normally be transmitting such ringing current even though none is shown in the specific example of circuit 106. Contacts 251 close to operate sleeve relay 210 over a circuit including thermistor TH21 after which contacts 219 close to shunt the thermistor in order to provide a slight delay to be sure that all ringing current is removed from conductors T4 and R4 before the talking circuit is completed.

Sleeve relay 210 operates to open contacts 211 and 217 thereby breaking the metallic connection including contacts 252 formerly placed across conductors T2 and R2. Contacts 213 and 215 open the ring trip connection to the connector switch. Contacts 212, 214, 216 and 218 complete the talking path.

Hold bridge relay 220 and calling bridge relay 440 operate over a circuit which may be traced from (−) battery, through the upper winding of calling bridge relay 440, the upper left winding of the repeat coil, contacts 337, conductor R2, brush 301, contacts 218, the winding of hold bridge relay 220, contacts 212, brush 300, conductors T2, the lower left winding of the repeat coil to ground (+) through the lower winding of relay 440.

Contacts 441 close to trip ringing current transmitted from distant office 105 over trunk 114*a*. Since (−) day battery is not connected to contacts 423 at this time, ring-up relay 330 is not locked; therefore, there is no problem of releasing this relay—it falls responsive to termination of ringing current from office 105. When hold relay 220 operates, it opens contacts 224 thereby extinguishing lamp L21. Signal relay 230 restores responsive to termination of ringing current from office 105 and the subsequent release of ring-up relay 330.

After the call is completed trunk circuit 106 is released as described above in the section entitled "Release."

When the answering party at substation A hangs up, sleeve relays 250 and 210 restore, thus returning the night service trunk circuit 107 to its normal condition. No effort is made to return the rotary switch wipers 300—302 to normal because it is a non-homing type switch which stands on the last terminal to be used until the next call at which time it searches over the remaining terminals in the bank and if the calling trunk is not found, the rotary switch searches over the first terminals of the bank until the calling trunk is found.

If a second night service call is received while the first is in progress, another trunk circuit operates signal relay 230 to sound bell 113*b*. However, nothing further happens at this time because stop relay 240 is holding contacts 245 open. The bell merely informs the roving guard that there is another call which he should answer.

MISCELLANEOUS

Several features have been shown but have not been explained since they do not relate directly to the invention and since they are standard items and are obvious to those skilled in the art. For example, several resistor-capacitor networks have been labeled "SP." These networks are for the purpose of spark protection. There are two "make busy" keys; these keys are for the purpose of making the circuit busy while maintenance men proceed to test or service the circuits involved. The monitor jack is to provide a means by which the maintenance men may monitor the calls going through the circuit to determine how well they are functioning.

While my drawing and specification show a single embodiment of the invention, it should be understood that this is for the purposes of illustration only and not to limit the scope of the claims. For example, my trunk circuit may be used in connection with many other types of calls extending services such as intercept, secretarial answering, or the like. Therefore, it is my intention to cover all devices that lay within the true spirit of my invention and not to cover only the specific details of the circuit.

What I claim is:

1. In a telephone system, a plurality of local lines, a local switch train for interconnecting said local lines, a plurality of trunk lines, a call extending service trunk circuit including switch means having terminal banks, means for connecting said trunk lines to said terminal banks, means responsive to a call on any one of said trunk lines for causing said switch means to connect with said one trunk line, means for transmitting a signal indicating the presence of an incoming call, and means for answering said extended call from any of said local lines via said local switch train and said switch means in said call extending service trunk circuit.

2. The telephone system of claim 1 wherein said local switch train comprises a connector switch, and circuit means connecting said trunk circuit to be seized via a particular position of said connector switch, means in said trunk circuit for normally marking said particular position as busy, means responsive to said call for removing said busy marking, said means for answering said extended call comprising said local switch train including said connector when directed to said particular position.

3. In a telephone system, a private branch exchange comprising, a plurality of local lines, a local switch train for interconnecting said local lines, a plurality of trunk lines, a night service trunk circuit including switch means having terminal banks, means for connecting said trunk lines to said terminal banks, means responsive to a call on any one of said trunk lines during periods of night service for causing said switch to hunt for and find said one trunk line and to transmit a signal indicating the presence of an incoming call, and means for answering said extended call from any of said local lines via said local switch train and said switch means in said night service trunk circuit.

4. In a telephone system, a private branch exchange comprising, a plurality of local lines, each terminating in a subscriber's station including a telephone dial, a local switch train controllable from said dials to interconnect any of said local lines, a distant office, a plurality of trunk lines interconnecting said distant office and said branch exchange, a trunk circuit terminating each of said trunk lines in said branch exchange, means normally connecting each of said trunk circuits to an operator position, a night service trunk circuit connected when said operator position is removed from service for extending calls incoming over said trunk lines from said distant office, means including a switch in said night service trunk circuit for extending an alarm signaling the presence of an incoming call, said switch including wipers and bank contacts, means for connecting said incoming trunk lines to said switch bank contacts via said trunk circuits, means responsive to an incoming call for operating said night service trunk circuit switch to find the bank contacts individual to that one of said trunk lines on which said call is incoming, and means for answering said extended calls from any of said local lines via said local switch train and said switch in said night service trunk circuit.

5. The telephone system of claim 4 wherein said local switch train comprises a plurality of switches, one of which includes bank terminals to which individual ones of said local lines are connected, and circuit means connecting said night service trunk circuit to a particular one of said terminals whereby a call may be answered from any of said local lines by setting said local switch train under the influence of said dial at said answering station to seize that one of said terminals which is individual to said night service trunk circuit, thereby completing said call via one of said trunk lines, said night service trunk circuit, its switch and said local switch train.

6. The telephone system of claim 5 and means in said distant office for transmitting ringing current over one of said trunk lines responsive to the extension of a call to said private branch exchange, means for operating said night service trunk circuit switch responsive to the receipt of said ringing current over said one trunk line, and means also responsive to receipt of said ringing current for extending said alarm signal.

7. A night service trunk circuit comprising, a switch having a plurality of brushes and corresponding bank contacts over which an incoming call may be extended, a signal relay operated responsive to the receipt of an incoming call, means responsive to operation of said signal relay for moving said switch to hunt over said bank contacts for extending said incoming call therefrom, means also responsive to the operation of said sginal relay for transmitting an alarm indicative of the presence of said call, circuit means connecting said night service trunk circuit to a particular terminal in a connector switch bank, means for normally marking said night service trunk circuit busy to said connector switch, and means responsive to said switch finding said contacts for marking said night service trunk circuit idle to said connector switch.

8. The night service trunk circuit of claim 7 and a source of office potential comprising a first predetermined potential and a second predetermined potential, both of which are applied at all times and a third predetermined potential which is applied only when said night service trunk circuit is out of operation, said second and third potentials being of the same polarity, said signal relay being a differential relay, means for connecting one side of one winding of said signal relay to said second potential, means for connecting one side of the other of said windings of said signal relay to said third potential, and means for connecting the other side of both said windings to said first potential responsive to the presence of said incoming call, whereby said signal relay is differentially energized when said third potential is applied and is operative when said third potential is removed.

9. The night service trunk circuit of claim 7 and means for selectively marking one of said bank contacts responsive to said incoming call, one of said brushes being operative to find said marking, a stop relay, means responsive to operation of said signal relay for causing said stop relay to be controlled via said one brush, means responsive to operation of said stop relay for stopping the motion of said rotary switch, a sleeve relay, means also responsive to said operation of said stop relay for removing said busy marking and for connecting said sleeve relay to be controlled from said connector, and means responsive to operation of said sleeve relay for completing a talking circuit and for performing associated supervisory functions.

10. The night service trunk circuit of claim 9 and timing means for delaying the operation of said sleeve relay.

11. A night service trunk circuit comprising a switch having a plurality of brushes and corresponding bank contacts over which an incoming call may be extended, a source of office potential comprising a first predetermined potential and a second predetermined potential, both of which are applied at all times, and a third predetermined potential which is applied only when said night service trunk circuit is out of operation, said second and third potentials being of the same polarity, a differential signal relay, means for connecting one side of one winding of said signal relay to said second potential, means for connecting one side of the other of said windings of said signal relay to said third potential, means for connecting the other side of both said windings to said first potential responsive to the presence of an unanswered incoming call, whereby said signal relay is differentially energized when said third potential is applied and is operative when said third potential is removed, means responsive to operation of said signal relay for moving said switch to hunt over said bank contacts for extending said unanswered incoming call therefrom, means also responsive to the operation of said signal relay for transmitting an alarm indicative of the presence of said call, means for selectively marking one of said bank contacts responsive to said incoming call, one of said brushes being operative to find said marking, a stop relay, means responsive to operation of said signal relay for causing said stop relay to be controlled via said one brush, means responsive to operation of said stop relay for stopping said switch, means for connecting said night service trunk circuit to a particular terminal in a connector switch bank, means for normally marking said night service trunk circuit busy to said connector switch, a sleeve relay, means also responsive to said operation of said stop relay for removing said busy marking and for connecting a sleeve relay to be controlled from said connector, and means responsive to operation of said sleeve relay for completing a talking circuit and for performing associated supervisory functions.

References Cited in the file of this patent

UNITED STATES PATENTS

| | | |
|---|---|---|
| 2,365,996 | Bakker | Dec. 26, 1944 |
| 2,496,902 | Voss | Feb. 7, 1950 |

OTHER REFERENCES

Telephony Magazine, "Completing PBX Calls," vol. 144, No. 9, February 28, 1953, pages 22, 24, 32 and 34.